United States Patent [19]
Young

[11] Patent Number: 6,059,211
[45] Date of Patent: May 9, 2000

[54] FISHING REEL WITH REEL BODY OF UNITARY SIDEWALL CONSTRUCTION

[75] Inventor: John Newton Young, Fairfax, Calif.

[73] Assignee: Charles C. Worth Corporation, San Rafael, Calif.

[21] Appl. No.: 09/114,693

[22] Filed: Jul. 13, 1998

Related U.S. Application Data

[60] Provisional application No. 60/052,387, Jul. 14, 1997.

[51] Int. Cl.[7] .................................................. A01K 89/01
[52] U.S. Cl. ......................... 242/241; 242/311; 242/314; 242/315; 242/282
[58] Field of Search .................................... 242/241, 311, 242/314, 315, 282

[56] References Cited

U.S. PATENT DOCUMENTS

| | | | |
|---|---|---|---|
| 2,583,465 | 1/1952 | Brown | 242/241 |
| 2,586,921 | 1/1952 | Delphon | 242/241 |
| 2,925,229 | 1/1960 | Wood | 242/282 |
| 2,974,895 | 3/1961 | Wood | 242/282 |
| 3,352,507 | 11/1967 | Boussageon | 242/241 |
| 3,381,914 | 5/1968 | Taggart | 242/242 |
| 3,967,791 | 7/1976 | Morishita | 242/242 |
| 4,427,162 | 1/1984 | Noda | 242/241 |
| 5,350,130 | 9/1994 | Hitomi et al. | 242/241 |
| 5,381,979 | 1/1995 | Furomoto | 242/282 |

*Primary Examiner*—Donald P. Walsh
*Attorney, Agent, or Firm*—Virginia H. Meyer, Esq.; Mark J. Spolyar, Esq.

[57] ABSTRACT

The present invention provides an improved spinning reel having a reel body of unitary sidewall construction. More specifically, the present invention provides a spinning reel having a reel body of unitary sidewall construction with a front or a back opening and an associated plate that removably attaches to the reel body opening to thereby enclose and hold the internal mechanisms and parts of the spinning reel. The use of the present invention allows a fisherman to substantially assemble and/or disassemble the spinning reel of the invention without the aid of tools, such as screwdrivers, wrenches, and the like.

24 Claims, 6 Drawing Sheets

FISHING REEL WITH REEL BODY OF UNITARY SIDEWALL CONSTRUCTION

CROSS REFERENCES TO RELATED APPLICATIONS

This application claims the benefit of U.S. provisional application Ser. No. 60/052,387 filed Jul. 14, 1997.

BACKGROUND OF THE INVENTION

1. Field of the Invention

The present invention relates to spinning reels. More particularly, the present invention relates to a spinning reel having a unitary sidewall reel body construction, allowing for simplified manufacturing and assembly and providing enhanced strength and durability.

2. Description of the Prior Art

Spinning reels of various designs and configurations are known in the art. Conventional spinning reel designs generally include a reel body having a separate side plate. The side plate is typically fixed to the reel body by standard screws. Reel body-side plate configurations facilitate the placement and assembly of the internal parts and mechanisms of conventional spinning reels. These internal parts generally include a main gear, main gear journaling means, pinion gear, pinion gear journaling means, main shaft support, and main shaft oscillation means. This conventional reel body-side plate configuration, however, creates certain disadvantages. First, this reel body-side plate configuration reduces the strength and rigidity of the reel body in that the full reel body has two halves joined by screws or the like. Second, conventional reel body-side plate configured reels also require tools for all major assemblies necessitating slow and cautious assembly and/or disassembly. These particular disadvantages increase the manufacturing costs of spinning reels. Further, this design forces the fisherman to carry tools, such as screwdrivers, wrenches, and the like, into the field in order to perform even the simplest maintenance and care of the spinning reel.

While the prior art spinning reels fulfill their respective objectives and requirements, they do not describe or suggest a spinning reel having a reel body of unitary sidewall construction with an opening and an associated plate that removably attaches to the opening of the reel body to thereby enclose and hold the internal parts of the spinning reel. The use of the present invention provides a spinning reel that requires no tools for assembly and/or disassembly of all major reel components.

SUMMARY OF THE INVENTION

The present invention provides a spinning reel having a reel body of unitary sidewall construction with a front or back opening and an associated plate that removably attaches to reel body opening to thereby enclose and hold the internal mechanisms and parts of the spinning reel. (As used herein, "spinning reel" refers to a fishing reel having an exposed rotor, spool, and bail mechanism, as opposed to a spin cast reel where the respective components are concealed under a hood.) The use of the present invention makes it possible for a fisherman to assemble and/or disassemble major components of the spinning reel without the aid of tools such as screwdrivers, wrenches, and the like.

The spinning reel according to the present invention generally comprises a reel body having a unitary sidewall construction and an opening, a reel body plate, a main gear assembly, a crank assembly, a main shaft oscillation assembly, a rotor, and a spool.

The reel body of the present invention is substantially hollow in configuration having a unitary sidewall construction, an opening, and first and second main gear shaft support tubes. The reel body opening may be in the front or the back of the reel body. The reel body plate is removably attached to the reel body at the reel body opening.

The main gear assembly is further comprised of a main gear and a main shaft having a keyed hole therethrough. The main gear assembly is inserted into the reel body such that the first end of the main gear shaft is positioned in the first support tube of the reel body and the second end of the main gear shaft is positioned in the second support tube of the reel body.

The crank assembly is comprised of a first bearing, a second bearing, a first bearing retainer, a second bearing retainer, a threaded end cap, a keyed crank shaft having a first threaded end and a second threaded end, and a handle. The first bearing is seated in the first support tube of the reel body such that the first end of the main gear shaft is journaled by the first bearing. The first bearing is retained by the first bearing retainer. The second bearing is seated in the second support tube of the reel body such that the second end of the main gear shaft is journaled by the second bearing. The second bearing is retained by the second bearing retainer. The keyed crank shaft engages the keyed hole of the main gear shaft. The handle is threadably attached to the first threaded end of the keyed crank shaft. The threaded end cap is attached to the second threaded end of the keyed crank shaft. The keyed crank shaft engages the keyed hole of the main gear shaft and is held fixed therein by the threaded end cap in a conventional manner such that turning of the handle effects rotation of the main gear assembly.

The main shaft oscillation assembly is further comprised of a main shaft having a lead screw, a main shaft key, a follower having a pawl ear, and a pinion gear having a pinion gear collar with a bore hole. The main shaft oscillation assembly engages the main shaft keyed bushing and the pinion support tube. When the reel body of the invention has a front opening, main shaft keyed bushing maybe integrally formed as part of the reel body and pinion support tube may be integrally formed as part of the front reel body plate. When the reel body of the invention has a rear opening, main shaft keyed bushing may be integrally formed as part of the rear reel plate and pinion support tube may be integrally formed as part of the reel body. The main shaft is positioned in the pinion support tube such that said main shaft is rotatably but not slidably fixed to the support tube. The main shaft oscillation assembly is journaled into and extends through the pinion gear. The follower, carried in the bore hole of the pinion collar, engages the lead screw of said main shaft through the engaging member.

Preferred embodiments of the present invention employ a main shaft lead screw oscillation mechanism. Such main shaft lead screw oscillation mechanisms are preferred because they facilitate the design and assembly of the spinning reels of the present invention. However, the exact configuration of the main shaft oscillation mechanism is not critical to the practice of the invention.

The rotor is operably fixed to the pinion gear of the main shaft oscillation assembly to rotate therewith, and the spool is fixed to the main shaft oscillation assembly to oscillate linearly therewith.

When the fisherman rotates the handle, the main gear turns the pinion gear, follower and rotor as a single unit.

Keyed bushing and main shaft key prevent main shaft from rotating (but not sliding) along its axis as the follower is rotated around the main shaft. As the follower is rotated, the engaging member rides within lead screw and presses the main shaft continuously in one axial direction and then in a reversed axial direction for as long as the crank shaft is rotated. As the main shaft oscillates, the spool is carried in corresponding oscillation.

Embodiments of the present invention may have an opening positioned at the front of the reel body and a corresponding front reel plate. In these embodiments, the reel body may have main shaft keyed bushing integrally formed therein. The front plate may have the pinion support tube integrally formed therein. The front plate is removably attached to the reel body by conventional means, including, but not limited to screws, threads, or a twist lock mechanism.

A first embodiment of the present invention includes reel body having a front opening and a front plate where the front plate is removably attached to the reel body by screws. The reel body has a first and a second thread tube integrally formed therein and the front plate has a first and a second screw hole also integrally formed therein. The front plate is removably attached to the reel body by aligning the first screw hole of the front plate with the first thread tube of the reel body, and the second screw hole of the front plate with the second thread tube of said reel body, and by then threadably engaging a first screw with the first screw hole of the front plate and the first thread tube of the reel body and a second screw into the second screw hole of the front plate and the second thread tube of said reel body.

The front plate may be removably attached to the reel body by any number of screws. The thread tubes may be positioned at any location in the reel body that does not interfere with the workings of the inner components of the fishing reel. The screw holes may by positioned at any location on the front plate that allows the screw holes to align with the thread tubes of the reel body.

The first embodiment of the present invention may have a front plate with an integrally formed alignment ring. The alignment ring of the front plate is positioned such that when the front plate is removably attached to the reel body, the alignment ring of the front plate is adjacent to the inner wall of the reel body. The alignment ring of the front plate aids the fisherman in aligning the screw holes of the front plate with the thread tubes of the reel body.

A second embodiment of the present invention includes reel body having a front opening and a front plate where the front plate is removably attached to the reel body by threads. The reel body has a front plate engaging thread integrally formed therein and the front plate has a reel body engaging thread integrally formed therein. The front plate engaging thread engages the reel body engaging thread thereby removably attaching the front plate to the reel body. The front plate may have a male reel body engaging thread and the reel body a female front plate engaging thread or the front plate may have a female reel body engaging thread and the reel body a male front plate engaging thread.

A third embodiment of the present invention includes reel body having a front opening and a front plate where the front plate is removably attached to the reel body by twist lock mechanism. The reel body has a female portion of a twist lock mechanism integrally formed therein and the front plate has a male portion of a twist lock mechanism integrally formed therein. The female portion of a twist lock mechanism engages the male portion of a twist lock mechanism thereby removably attaching the front plate to the reel body. The front plate and reel body may also be removably attached when the front plate having a female portion of a twist lock mechanism integrally formed therein engages the male portion of a twist lock mechanism that is an integral part of the reel body.

The first, second and third embodiments of the present invention all have reel body with a front opening and a front plate. These three embodiments may further include a bail trip cam. The bail trip cam may be an integral part of the front reel plate. The bail trip cam is positioned on the front reel plate to engage a conventional bail wire mechanism.

The first, second and third embodiments of the present invention may also further include anti-reverse mechanism support. The anti-reverse mechanism support is comprised of a reel body support tube and a front plate support tube. The anti-reverse mechanism functions as a part of the fishing reel having a reel body with a front opening and a front plate in a conventional manner.

Additional embodiments of the present invention may have an opening positioned at the rear of the reel body and a corresponding rear reel plate. In these embodiments, the reel body has pinion support tube integrally formed therein. The rear plate may have main shaft keyed bushing integrally formed therein. The rear plate is removably attached to the reel body by conventional means, including, but not limited to screws, threads, or a twist lock mechanism.

A fourth embodiment of the present invention includes reel body having a rear opening and a rear plate where the rear plate is removably attached to the reel body by screws. The reel body has a first and a second thread tube integrally formed therein and the rear plate has a first and a second screw hole also integrally formed therein. The rear plate is removably attached to the reel body by aligning the first screw hole of the rear plate with the first thread tube of the reel body, and the second screw hole of the rear plate with the second thread tube of said reel body, and by then threadably engaging a first screw with the first screw hole of the rear plate and the first thread tube of the reel body and a second screw into the second screw hole of the rear plate and the second thread tube of said reel body.

The rear plate may be removably attached to the reel body by any number of screws. The thread tubes may be positioned at any location in the reel body that does not interfere with the workings of the inner components of the fishing reel. The screw holes may by positioned at any location on the rear plate that allows the screw holes to align with the thread tubes of the reel body.

In other embodiments of the invention the rear plate is removably attached to the reel body by conventional means, including, but not limited to threads or a twist lock mechanism as taught in the third and fourth embodiments of this invention, respectively.

The embodiments of the present invention having reel body with a rear opening and a rear plate, including the fourth embodiment, may further include a bail trip cam. The bail trip cam may be an integral part of the reel body. The bail trip cam is positioned on the reel body to engage a conventional bail wire mechanism.

The embodiments of the present invention having reel body with a rear opening and a rear plate, including the fourth embodiment, may also further include an anti-reverse mechanism support. The reel body has a first anti-reverse shaft support tube and the rear plate has a second anti-reverse shaft support tube. The anti-reverse shaft is held by the first anti-reverse support tube and by the second anti-reverse support tube. The anti-reverse mechanism functions as a part of the fishing reel having a reel body with a rear opening and a rear plate in a conventional manner.

The fifth embodiment of the present invention allows a fisherman to assemble and/or disassemble major components of the fishing reel of the invention with out the aid of tools. In this embodiment of the invention a rotor nut fixes the rotor to the pinion. The rotor nut has a knurled surface that permits attachment and removal of the rotor nut by hand. The knurled rotor nut may be used to fix the rotor to the pinion of fishing reels having a reel body with a front opening and a front reel plate, or on fishing reels having a reel body with a rear opening and a rear plate. When the knurled rotor nut of this embodiment is placed on the second or third embodiment of this invention the fisherman requires no tools to assembly and/or disassemble the fishing reel.

The sixth embodiment of the present invention allows a fisherman to assemble and/or disassemble major components of the fishing reel of the invention by hand without the aid of tools. In this embodiment of the invention a rotor nut fixes the rotor to the pinion. The rotor nut has at least one wing extending therefrom that permits attachment and removal of the rotor nut by hand. The winged rotor nut may be used to fix the rotor to the pinion of fishing reels having a reel body with a front opening and a front reel plate, or on fishing reels having a reel body with a rear opening and a rear plate. When the winged rotor nut of this embodiment is placed on the second or third embodiment of this invention the fisherman requires no tools to assembly and/or disassemble the fishing reel.

As the Figures indicate, the internal components and the reel body of the present invention must only be configured with respect to one another such that the internal components of the fishing reel pass through the front or back opening of the reel body and install with or onto features integral with the reel body. Thus, the reel body may take many forms depending on the particular component configurations employed without departing from the spirit and scope of the present invention. Therefore, the exact configuration of any component of the spinning reel, is not critical to the practice of the invention.

In addition, preferred embodiments of the present invention employ a main shaft lead screw oscillation mechanism. Such main shaft lead screw oscillation mechanisms are preferred because they facilitate the design and assembly of the spinning reels of the present invention. However, the exact configuration of the main shaft oscillation mechanism is not critical to the practice of the invention.

OBJECTS OF THE INVENTION

It is an object of the present invention to provide a spinning reel having a reel body with a unitary sidewall construction possessing enhanced rigidity and durability over conventional reel body-side plate configured spinning reels.

It is another object of the present invention to provide a spinning reel design that eliminates the manufacturing problems associated with designing, aligning, and assembling a side plate to the reel body.

It is another object of the present invention to provide a spinning reel that obviates the need and costs associated with side plate screw attachment means.

It is a further object of the invention to provide a spinning reel whose main mechanisms are easy to access and service.

It is another object of the present invention to provide a spinning reel whose design also permits the use of standard spinning reel components.

It is yet another object of the present invention to provide a spinning reel with increased main shaft support thereby enhancing spool and rotor stability.

It is another object of the invention to provide a design that improves the operating lifetime of the spinning reel.

Yet another object of the present invention is to provide a spinning reel whose major components may be assembled and/or disassembled by hand without the aid of tools.

BRIEF DESCRIPTION OF THE DRAWINGS

FIGS. 4a, b & c.

The same reference numbers refer to the same parts throughout the various Figures.

DETAILED DESCRIPTION OF A FIRST PREFERRED EMBODIMENT

Figure 1:
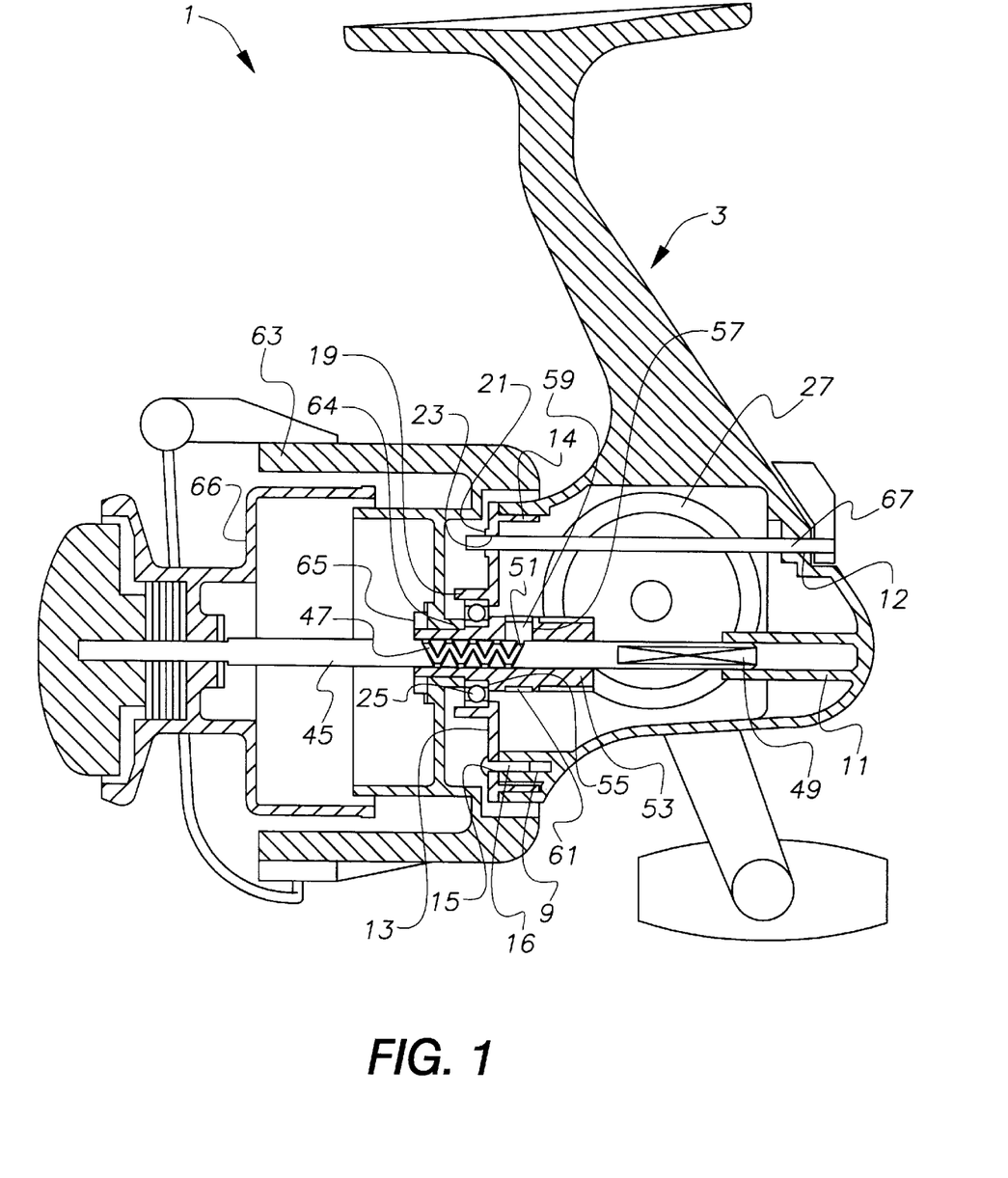
FIG. 1 is a cross sectional view of the first preferred embodiment of the present invention.
Figure 2:
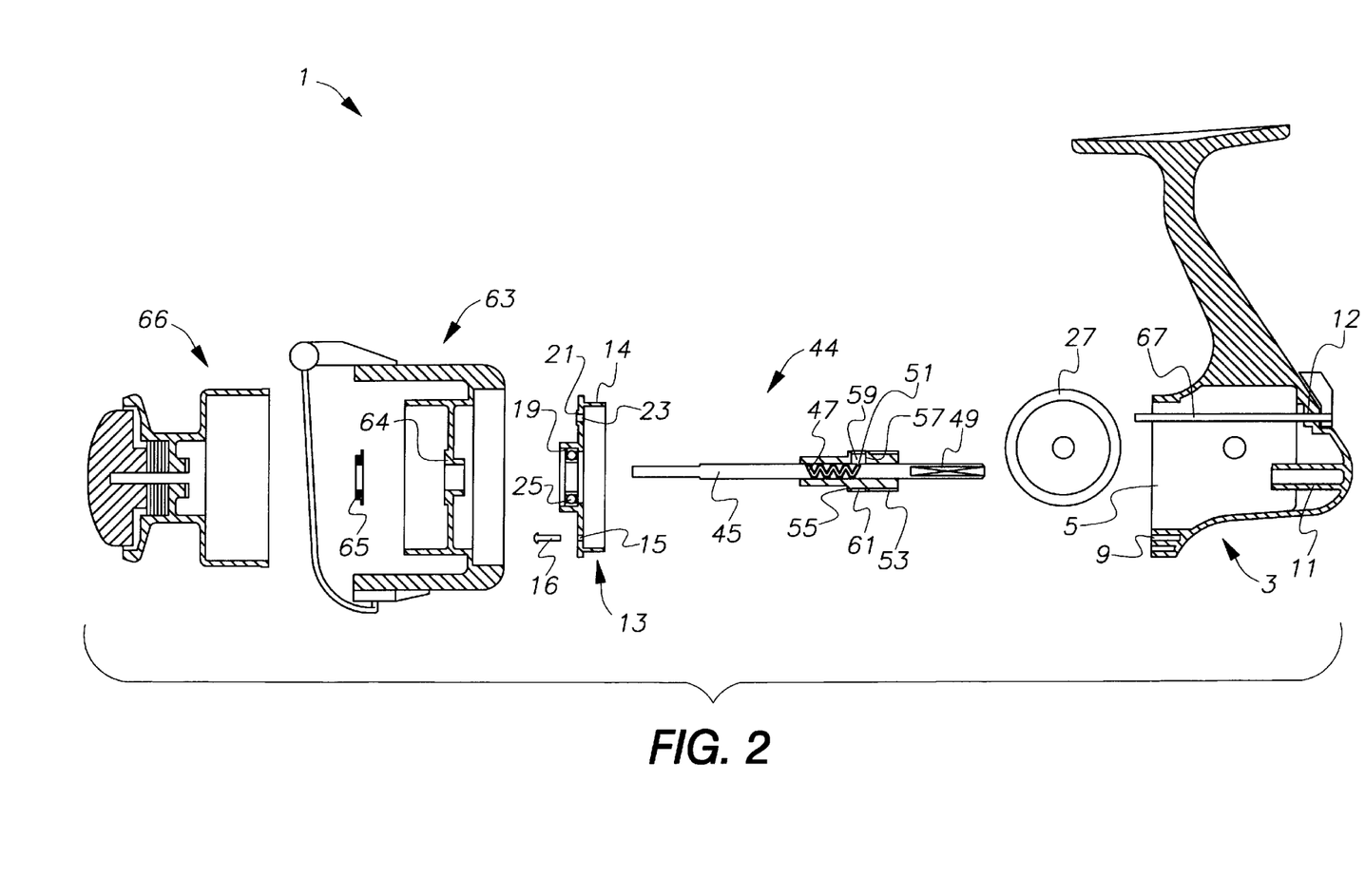
FIG. 2 is an exploded view of the first preferred embodiment of the present invention shown in FIG. 1.

As the various Figures show, the present invention provides a fishing reel having a reel body of unitary sidewall construction. FIG. 1 shows the assembled fishing reel of the first embodiment of the invention. FIG. 2 shows an exploded view of the fishing reel of FIG. 1.

Spinning reel 1 of the first preferred embodiment generally comprises reel body 3, main gear assembly, main shaft oscillation assembly 44, front plate 13, rotor 63, and spool 66. (See FIGS. 1 and 2.)

Reel body 3 has a unitary sidewall construction and is formed to include an opening 5 positioned at the front of reel body 3, and main shaft keyed bushing 11. (See FIGS. 1 & 2.) Reel body 3 has first reel body main gear support tube 7, second reel body main gear support tube 8, first thread tube 9 and second thread tube 10. (See FIG. 4a.) Reel body front opening 5 has a diameter sufficient to permit insertion of main gear assembly, comprised of main gear 27 and main gear shaft 29, into reel body 3. (See FIGS. 1 & 2.)

Front plate 13 of the first preferred embodiment is formed to have first screw hole 15, second screw hole 17, and front plate bearing support tube 19. First screw hole 15 and second screw hole 17 align with first thread tube 9 and second thread tube 10, respectively, of reel body 3. (See FIG. 4a.)

Front plate 13 may have alignment ring 14 integrally formed therein. Alignment ring 14 is located on front plate 13 such that removably attaching front plate 13 to reel body 3 positions said alignment ring 14 adjacent to the inner wall of reel body 3. (See FIG. 1.)

The first preferred embodiment may include bail trip cam 21. Bail trip cam 21 is conventional in prior art reels. Front plate 13 has a bail trip cam 21 integrally formed therein. Bail trip cam 21 is positioned to engage a conventional bail wire mechanism. Because some conventional bail trip mechanisms do not employ trip cams, front plate 13 of the present invention may be formed without bail trip cam 21.

A conventional anti-reverse control mechanism (not shown, except for anti-reverse control shaft 67) may be included in the first preferred embodiment. To that end, reel body 3 has first anti-reverse control shaft support tube 12 and front plate 13 has second anti-reverse shaft support tube 23. Anti-reverse control shaft 67 is supported as in conventional prior art reels. Anti-reverse shaft 67 is pivotally held by said first anti-reverse support tube 12 and by said second anti-reverse support tube 23.

As shown in FIGS. 1 & 2, provided in the first preferred embodiment is main gear assembly. Main gear assembly is comprised of main gear 27 and main gear shaft 29 having a first and second end and a keyed cavity extending therethrough as is conventional with prior art reels (not shown).

Next provided in spinning reel 1 of the first preferred embodiment is main shaft oscillation assembly 44. Main shaft oscillation assembly 44 includes main shaft 45, pinion gear 53, and having engaging member 51. Main shaft 45 is formed to include lead screw 47, and main shaft key 49. Pinion gear 53 follower 59 is formed with collar 55 integral therewith. Pinion collar 55 contains a bore hole 57 therethrough to support follower 59 in pivotal alignment with lead screw 47 at engaging member 51. Spring retainer 61 circumscribes pinion collar 55 in a shallow groove there around and presses ear 51 of follower 59 in constant alignment in lead screw 47. (See FIGS. 1 & 2.)

Spinning reel 1 of the present invention is assembled by positioning main gear assembly and main shaft oscillation assembly 44 in reel body 3, attaching front plate 13 to reel body 3, attaching rotor 63 to the main shaft oscillation assembly 44, and attaching spool 66 to main shaft 45. (See FIGS. 1 & 2.)

Main gear assembly fits through front opening 5 of reel body 3. First end of main gear shaft 29 is positioned into first main gear support tube 7 and second end of main gear shaft 29 is positioned into second main gear support tube 8 of reel body 3. (See FIG. 3.)

The crank assembly is comprised of first bearing 31, second bearing 33, first bearing retainer 35, second bearing retainer 37, a threaded end cap 39, keyed crank shaft 41 having a first threaded end and a second threaded end, and handle 43. First bearing 31 is seated in first support tube 7 of reel body 3 such that the first end of main gear shaft 29 is journaled by first bearing 31. First bearing 31 is retained by first bearing retainer 35. Second bearing 33 is seated in second support tube 8 of reel body 3 such that second end of the main gear shaft 29 is journaled by second bearing 33. Second bearing 33 is retained by the second bearing retainer 37. Keyed crank shaft 41 engages keyed hole of main gear shaft 29. Handle 43 is attached to first end of keyed crank shaft 41. Threaded end cap 39 is threadably attached to second threaded end of keyed crank shaft 41. Keyed crank shaft 41 engages the keyed hole of main gear shaft 29 and is held fixed therein by threaded end cap 39 in a conventional manner such that turning of handle 43 effects rotation of main gear assembly 26. (See FIG. 3.)

Figure 3:
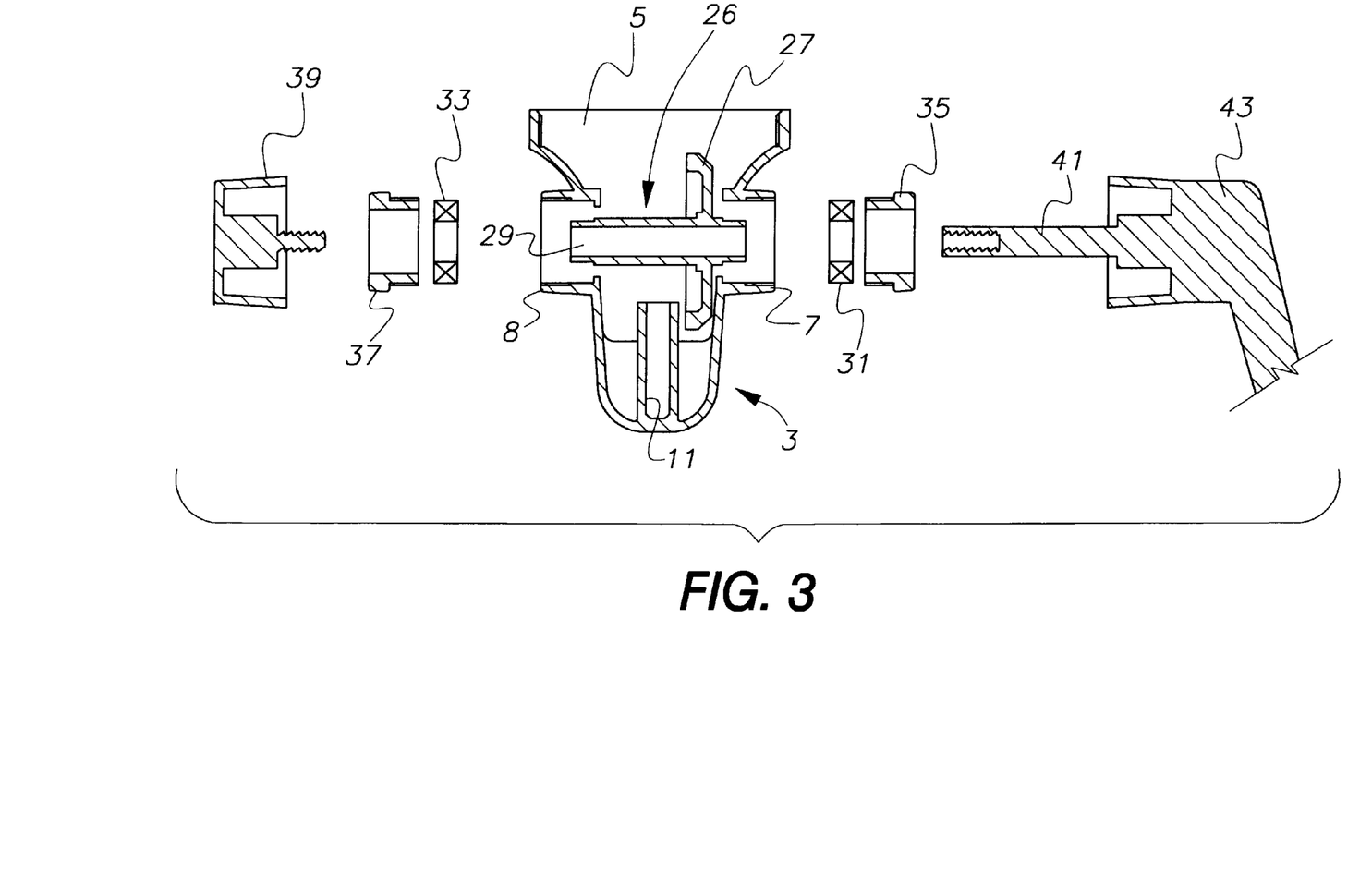
FIG. 3 is a sectional bottom view of the second preferred embodiment of the present invention.

The main shaft oscillation assembly 44 is positioned in reel body 3 such that main shaft key 49 is held rotationally but not slidably fixed in keyed bushing 11 of reel body 3. Pinion gear 53 engages main gear 27 of the main gear assembly such that when handle 43 is turned, pinion gear 53 rotates in a conventional manner by gear faces engaged between pinion gear 53 and main gear 27.

Front plate 13 is attached to reel body 3 by first screw 16 and second screw 18. First screw hole 15 and second screw hole 17 of front plate 13 are aligned with first thread tube 9 and second thread tube 10, respectively, of reel body 3. First screw 16 attaches front plate 13 to reel body 3 by engaging threads of thread tube 9. Second screw 18 attaches front plate 13 to reel body 3 by engaging threads of thread tube 10. When front plate 13 is attached to reel body 3 the internal mechanisms of spinning reel 1, i.e. the main gear assembly and main shaft oscillation assembly 44 are held operably in place. Specifically, main shaft 45 extends through pinion gear 53 of main shaft oscillation assembly 44. Bearing support tube 19 of front plate 13 and pinion bearing 25 rotatably support pinion gear 53. Bearing 25 is fixed into bearing support tube 19 by conventional means known in the art. Such conventional means include screws or retaining rings, and the like.

The construction and assembly of the remaining components of spinning reel 1 substantially mirror conventional spinning reel designs. Specifically, rotor 63 is fixed to pinion gear 53 in a conventional manner by a key therebetween and by rotor nut 65. In addition, spool 66 is also affixed to main shaft 45 in a conventional manner that will not be discussed.

In the first preferred embodiment, when the fisherman rotates handle 43, main gear 27 turns pinion gear 53, follower 59 and rotor 63 as a single unit. Keyed bushing 11 of reel body 3 and main shaft key 49 prevent main shaft 45 from rotating (but not sliding) along its axis as follower 59 is rotated around main shaft 45. As follower 59 is rotated, engaging member 51 rides within lead screw 47 and presses main shaft 45 continuously in one axial direction and then in a reversed axial direction for as long as crank shaft 41 is rotated. As main shaft 45 oscillates, spool 66 is carried in corresponding oscillation.

DETAILED DESCRIPTION OF A SECOND PREFERRED EMBODIMENT

Figures 4A, 4B:
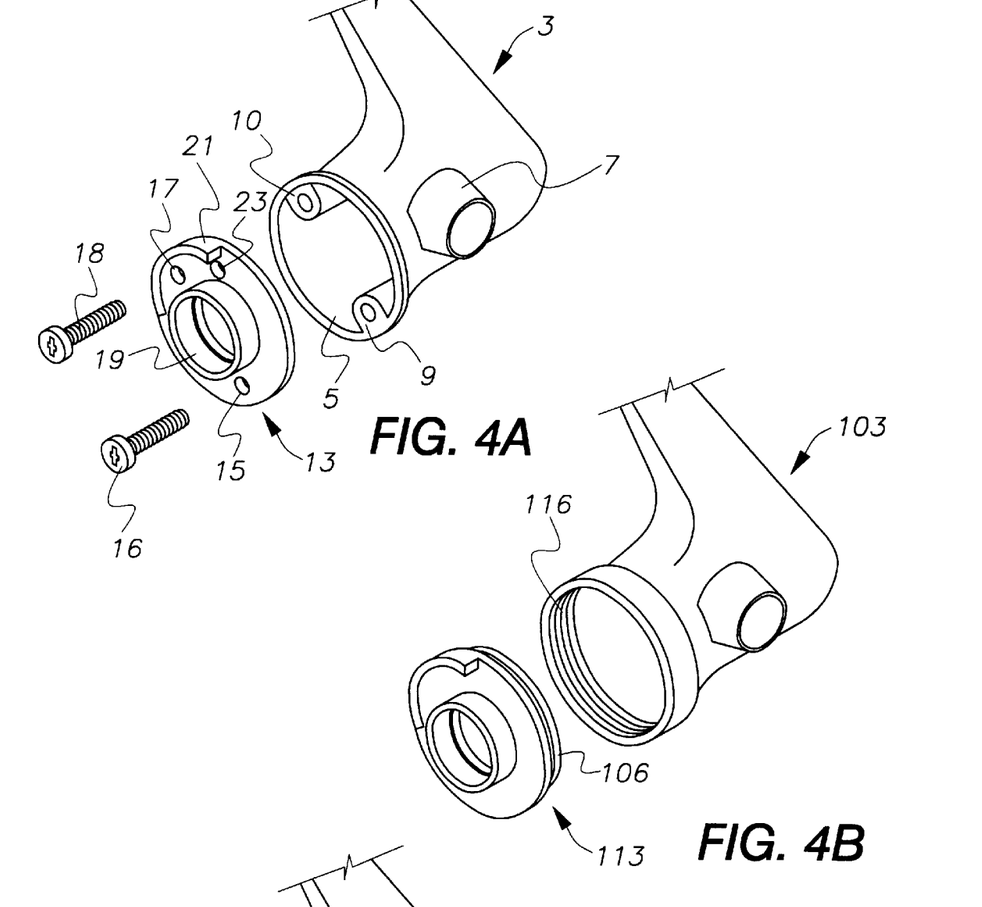
FIG. 4a is a perspective view of the reel body of the first preferred embodiment.
FIG. 4b is a perspective view of the reel body of the second preferred embodiment.

The second preferred embodiment teaches possible modifications, while employing the same principles of the present invention. Specifically, as shown in FIG. 4b, the second preferred embodiment employs a thread assembly to removably attach the front plate to the front opening of the reel body.

Otherwise, the configuration and assembly of the second preferred embodiment is substantially the same as the first preferred embodiment. Reference, therefore, should be made to the description of the first preferred embodiment.

Reel body 103 has front plate engaging thread 116 integrally formed therein. Front plate 113 has a reel body engaging thread 106 integrally formed therein. Front plate engaging thread 106 engages reel body engaging thread 116 thereby removably attaching front plate 113 to said reel body 103. (See FIG. 4b.)

DETAILED DESCRIPTION OF A THIRD PREFERRED EMBODIMENT

Figure 4C:
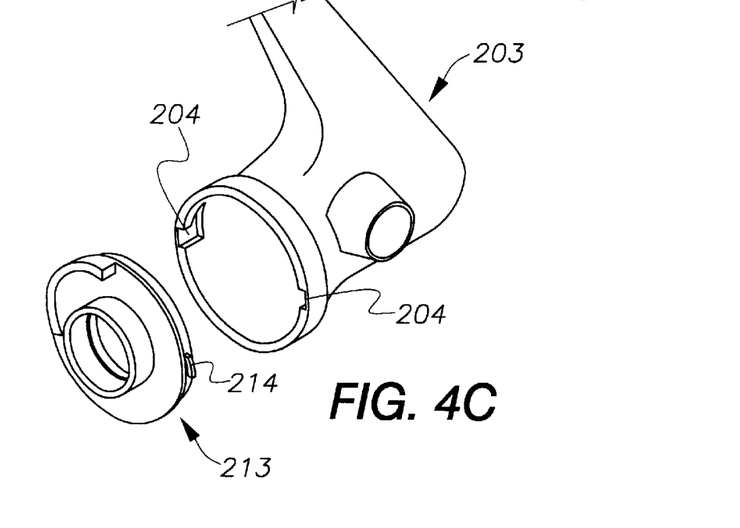
FIG. 4c is an perspective view of the reel body of the third preferred embodiment.

The third preferred embodiment teaches another form of reel body-front plate attachment. Specifically, as shown in FIG. 4c, the third preferred embodiment features a twist-lock mechanism to removably attach the front plate to the front opening of the reel body.

Otherwise, the configuration and assembly of the third preferred embodiment is substantially the same as the first preferred embodiment. Reference, therefore, should be made to the description of the first preferred embodiment.

Reel body 203 has female portion of twist lock mechanism 204 integrally formed therein. Front plate 213 has male portion of twist lock mechanism 214 integrally formed therein. Female portion of twist lock mechanism 204 engages male portion of twist lock mechanism 214 thereby removably attaching said front plate 213 to said reel body 203.

DETAILED DESCRIPTION OF A FOURTH PREFERRED EMBODIMENT

Figure 5:
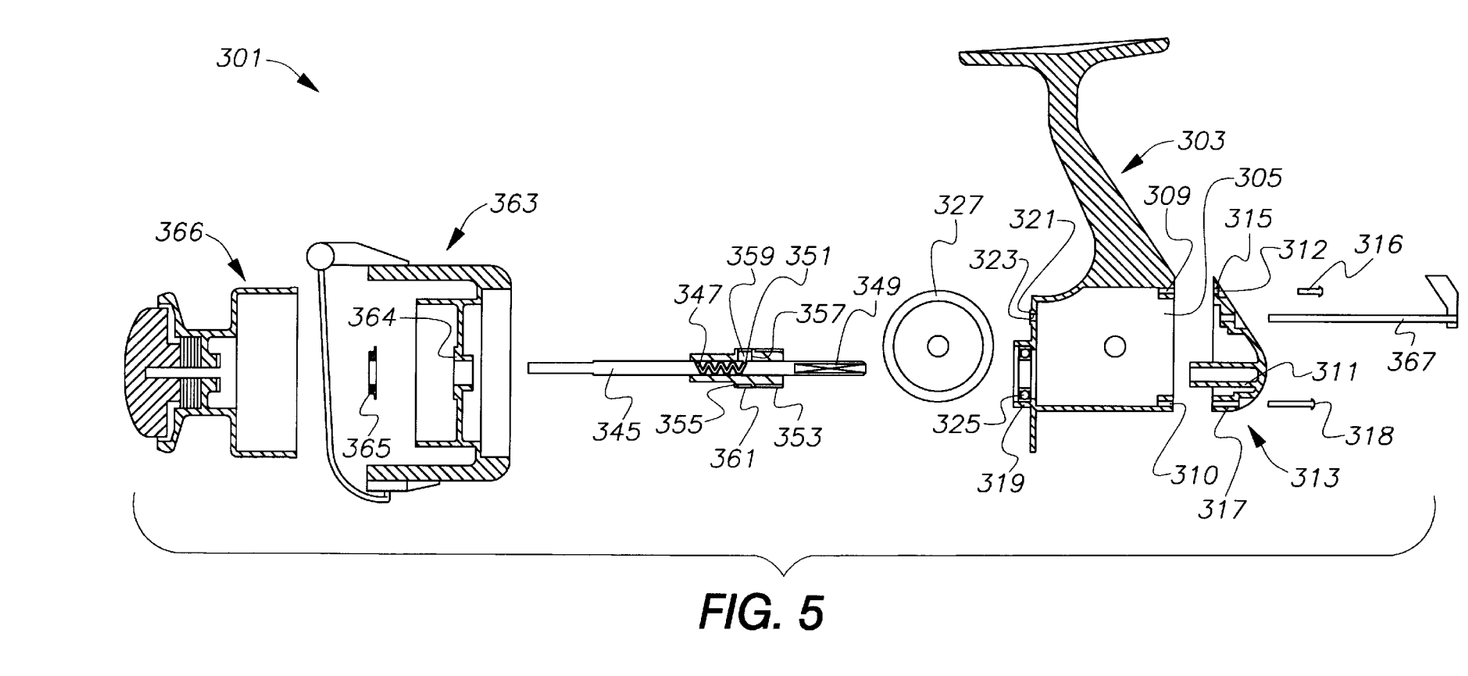
FIG. 5 is an exploded view of the fourth embodiment of the present invention.

The fourth preferred embodiment of the present invention features a reel body having a back opening and an associated back plate. Otherwise, the configuration and assembly of the third preferred embodiment is substantially the same as the first preferred embodiment. Reference, therefore, should be made to the description of the first preferred embodiment.

Reel body opening 305 is positioned at the rear of reel body 303. Reel body 303 has pinion support tube 319 integrally formed therein. Rear plate 313 has said main shaft keyed bushing 311 integrally formed therein. Rear plate 313 removably attaches to the rear of reel body 303 at reel body opening 305.

Reel body 303 has first thread tube 309 and second thread tube 310 integrally formed therein. Rear plate 313 has first screw hole 315 and second screw hole 317 integrally formed therein. First screw hole 315 of rear plate 313 aligns with first thread tube 309 of reel body 303, and second screw hole 317 of rear plate aligns with second thread tube 310 of said reel body, such that a first screw 316 threadably engages first screw hole 315 of rear plate 313 and first thread tube 309 of reel body 303, and second screw 318 threadably engages second screw hole 317 of rear plate 313 and second thread tube 310 of reel body 303 thereby removably attaching rear plate 313 to reel body 303.

The assembly of the fourth preferred embodiment differs from the first preferred embodiment in that the user installs the main gear assembly through opening 305 of reel body 303 rather than front opening 5 of reel body 3 of the first preferred embodiment of the invention. Bearing 325 and main shaft oscillation assembly 344, are inserted into support tube 319 of reel body 303 as in the first preferred embodiment. Rear plate 313 removable attaches to back opening 305 such that keyed bushing 311 holds keyed surface 349 of main shaft 345 rotationally, but not slidably, fixed.

DETAILED DESCRIPTION OF A FIFTH PREFERRED EMBODIMENT

The fifth preferred embodiment of the present invention features a fishing reel that makes it possible for a fisherman to assemble and/or disassemble major components of the spinning reel without the aid of tools such as screwdrivers, wrenches, and the like. Conventional rotor nut 65 can be replaced with nuts of an alternate construction.

Figure 6:
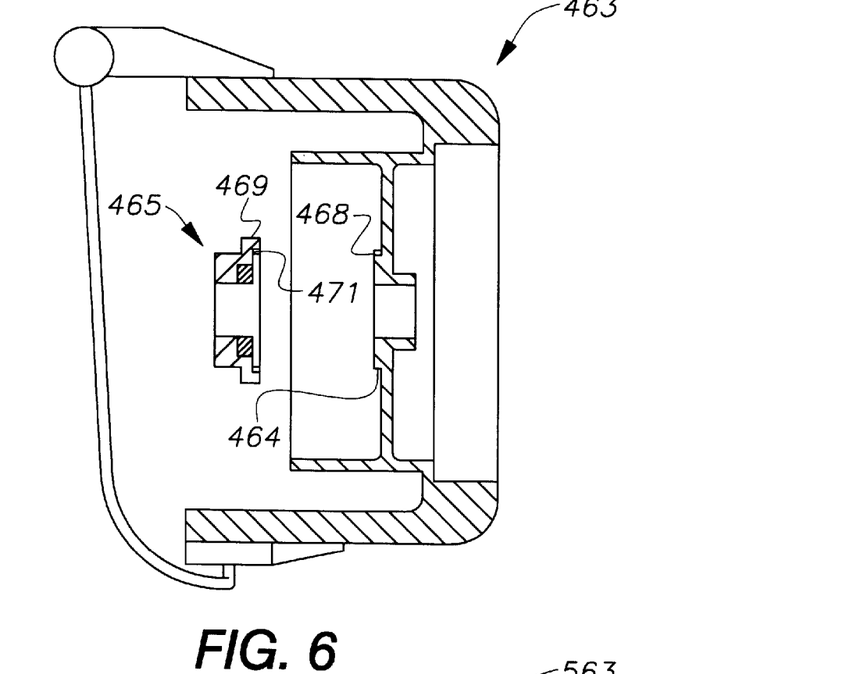
FIG. 6 is a sectional side view of the knurled rotor nut and rotor of the fifth preferred embodiment; and, FIG. 7 is a sectional side view of the winged rotor nut and rotor of the sixth preferred embodiment of the present invention.

FIG. 6 shows rotor nut 465 having ratchet recesses 471 in ring configuration 469. Rotor extension 464 of rotor 463 has tab 468. Tab 468 engages rachet recess 471 of rotor nut 465 to provide a locking function at any selected stop point of rotor nut 465. Rotor nut 465 fixes rotor 463 to pinion gear (not shown). Rotor nut 465 has a knurled surface that permits attachment and removal of rotor nut 465 by hand. When rotor nut 465 fixes rotor 463 to pinion gear 153 of the second or pinion gear 253 of the third preferred embodiment of the invention a fisherman can assemble and/or disassemble major components of the spinning reel without the aid of tools such as screwdrivers, wrenches, and the like.

Otherwise, the configuration and assembly of the fifth preferred embodiment is substantially the same as the first preferred embodiment. Reference, therefore, should be made to the description of the first preferred embodiment.

DETAILED DESCRIPTION OF A SIXTH PREFERRED EMBODIMENT

The sixth preferred embodiment of the present invention features a fishing reel that makes it possible for a fisherman to assemble and/or disassemble major components of the spinning reel without the aid of tools such as screwdrivers, wrenches, and the like.

Figure 7:
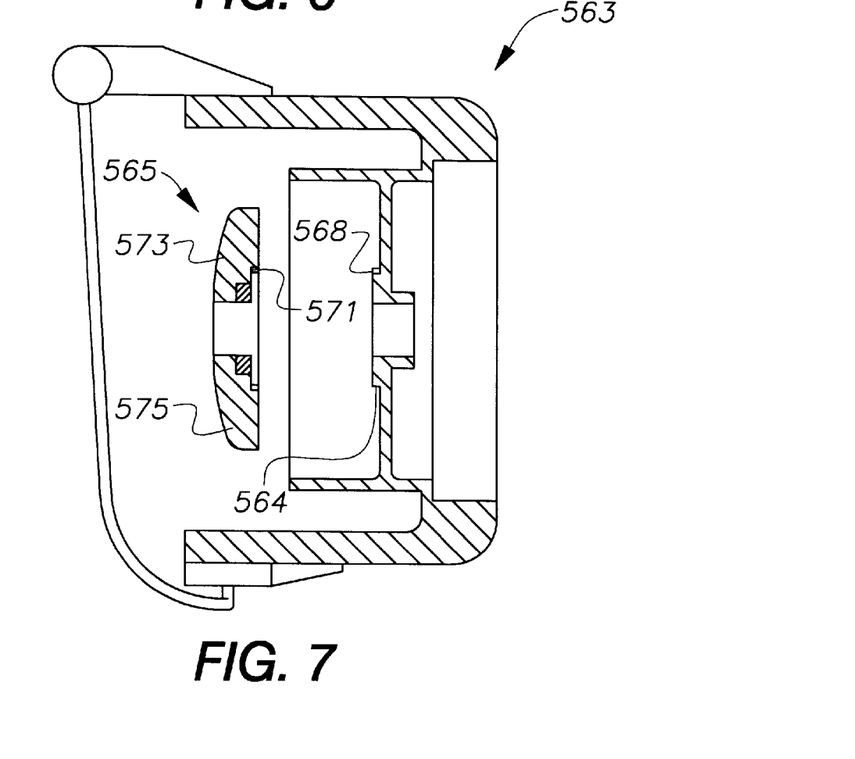

FIG. 7 shows rotor nut 565 having first wing 573, second wing 575 and ratchet recesses 571. Rotor extension 564 of rotor 563 has tab 568. Tab 568 engages rachet recess 571 of rotor nut 565 to provide a locking function at any selected stop point of rotor nut 565. Rotor nut 565 fixes rotor 563 to pinion gear (not shown). Rotor nut 565 has wings 573 and 575 that permits attachment and removal of rotor nut 565 by hand. When rotor nut 565 fixes rotor 563 to pinion gear 153 of the second or pinion gear 253 of the third preferred embodiment of the invention a fisherman can assemble and/or disassemble major components of the spinning reel without the aid of tools such as screwdrivers, wrenches, and the like.

Otherwise, the configuration and assembly of the fifth preferred embodiment is substantially the same as the first preferred embodiment. Reference, therefore, should be made to the description of the first preferred embodiment.

SUMMARY

With respect to the above description then, the optimum dimensional relationships for the parts of the invention, to include variations in size, materials, shape, form, function and the manner of operation, assembly and use, are readily apparent and obvious to one skilled in the art. Accordingly, all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, the invention is not limited to the exact construction and operation shown and described. Therefore, all suitable modifications and equivalents which may be resorted to fall within the scope of the invention.

What is claimed is:

1. A spinning reel comprising:
   a reel body having unitary sidewalls, an opening, and first and second support tubes;
   a reel body plate having a pinion gear support tube extending therefrom;
   means for removably attaching said reel body to said reel body plate;
   a main gear assembly,
      said main gear assembly comprising
         a main gear and a main gear shaft having a keyed hole therethrough, said main gear shaft extending through said main gear along the central axis thereof;
      said main gear assembly being inserted in said reel body such that the first end of said main gear shaft is positioned in said first support tube and the second end of said main gear shaft is positioned in said second support tube;
   a crank assembly,
      said crank assembly comprising
         a first and a second bearing, a first and a second bearing retainer, an end cap, a keyed crank shaft having a first end and a second end, and a handle;

said first bearing being seated in said first support tube such that said first end of said main gear shaft is journaled by said first bearing, said first bearing being retained by said first bearing retainer, said second bearing being seated in said second support tube such that said second end of said main gear shaft is journaled by said second bearing, said second bearing being retained by said second bearing retainer, said keyed crank shaft extending through and engaging said keyed hole of said main gear shaft, said handle attached to said first end of said keyed crank shaft, said end cap attached to said second end of said keyed crank shaft;

a main shaft keyed bushing attached to said reel body;

a main shaft oscillation assembly, said main shaft oscillation assembly comprising a main shaft having a lead screw track defined therein and a main shaft key at a first end thereof;

a tubular pinion gear having a pinion gear collar extending therefrom, said pinion gear collar having a bore hole therethrough;

said pinion collar journaled into said pinion gear support tube of said reel body plate, and a follower;

said main shaft journaled into and extending through said tubular pinion gear;

said first end of said main shaft being positioned into said main shaft keyed bushing such that said main shaft is rotatably but not slidably fixed thereto;

said follower positioned in said bore hole of said pinion gear collar and engaging said lead screw track of said main shaft;

a rotor attached to said pinion gear to rotate therewith; and a spool, said spool attached to said main shaft to oscillate linearly therewith.

2. The fishing reel of claim 1 wherein said reel body having said main shaft keyed bushing integrally formed therein; and said front plate having said pinion support tube integrally formed therein.

3. The fishing reel of claim 2 wherein screw means removably attach said reel body to said reel body plate.

4. The fishing reel of claim 2 wherein said reel body has a first and a second thread tube integrally formed therein;

said reel body plate has a first and a second screw hole integrally formed therein; and said first screw hole of said reel body plate being aligned with said first thread tube of said reel body, and said second screw hole of said reel body plate being aligned with said second thread tube of said reel body, such that a first screw threadably engaging said first screw hole of said reel body plate and said first thread tube of said reel body, and a second screw threadably engaging said second screw hole of said reel body plate and said second thread tube of said reel body thereby removably attaching said reel body plate to said reel body.

5. The fishing reel of claim 2 wherein said reel body has an inner and an outer wall; and said reel body plate has an alignment ring integrally formed therein such that removably attaching said reel body plate to said reel body positions said alignment ring of the reel body plate being adjacent to the inner wall of the reel body.

6. The fishing reel of claim 2 wherein said reel body has a reel body plate engaging thread integrally formed therein;

said reel body plate has a reel body engaging thread integrally formed therein; and said reel body plate engaging thread engaging said reel body engaging thread thereby removably attaching said reel body plate to said reel body.

7. The fishing reel of claim 2 wherein said reel body has a female portion of a twist lock mechanism integrally formed therein;

said reel body plate has a male portion of a twist lock mechanism integrally formed therein; and said female portion of a twist lock mechanism engaging said male portion of a twist lock mechanism thereby removably attaching said reel body plate to said reel body.

8. The fishing reel of claim 2 wherein said reel body has a male portion of a twist lock mechanism integrally formed therein;

said reel body plate has a female portion of a twist lock mechanism integrally formed therein; and said male portion of a twist lock mechanism engaging said female portion of a twist lock mechanism thereby removably attaching said reel body plate to said reel body.

9. The fishing reel of claim 2 wherein said reel body has a first anti-reverse shaft support tube;

said front plate has a second anti-reverse shaft support tube; and an anti-reverse shaft being held by said first anti-reverse support tube and by said second anti-reverse support tube.

10. The fishing reel of claim 2 wherein said rotor includes first and second rotor arms and a bail wire mechanism extending between said first and second rotor arms, said bail wire mechanism selectively positionable between a first open position and a second closed position and including a bail wire trip mechanism, and said front reel plate has a bail trip cam integrally formed therein, said bail trip cam being positioned to engage said bail wire trip mechanism.

11. The fishing reel of claim 1 wherein a rotor nut fixes said rotor to said pinion, wherein said rotor nut has a knurled surface permitting attachment and removal of said rotor nut by hand.

12. The fishing reel of claim 6 wherein a rotor nut fixes said rotor to said pinion, wherein said rotor nut has a knurled surface permitting attachment and removal of said rotor nut by hand.

13. The fishing reel of claim 7 wherein a rotor nut fixes said rotor to said pinion, wherein said rotor nut has a knurled surface permitting attachment and removal of said rotor nut by hand.

14. The fishing reel of claim 1 wherein a rotor nut fixes said rotor to said pinion, wherein said rotor nut has at least one wing extending therefrom permitting attachment and removal of said rotor nut by hand.

15. The fishing reel of claim 6 wherein a rotor nut fixes said rotor to said pinion, wherein said rotor nut has at least one wing extending therefrom permitting attachment and removal of said rotor nut by hand.

16. The fishing reel of claim 7 wherein a rotor nut fixes said rotor to said pinion, wherein said rotor nut has at least one wing extending therefrom permitting attachment and removal of said rotor nut by hand.

17. A spinning reel comprising:

a reel body having unitary sidewalls and a rear wall, an opening opposite said rear wall, and first and second support tubes extending from said sidewalls, said reel body having a keyed bushing attached thereto;

a reel body plate removably attached to said reel body at said opening, said reel body plate having a pinion gear support tube extending therefrom;

a main gear assembly, said main gear assembly comprising a main gear and a main gear shaft having a keyed hole therethrough, said main gear shaft attached to and extending through said main gear along the central axis thereof;

said main gear assembly being inserted in said reel body such that the first end of said main gear shaft is positioned in said first support tube and the second end of said main gear shaft is positioned in said second support tube;

a crank assembly, said crank assembly comprising a first and a second bearing, a first and a second bearing retainer, an end cap, a keyed crank shaft having a first end and a second end, and a handle;

said first bearing being seated in said first support tube such that said first end of said main gear shaft is journaled by said first bearing, said first bearing being retained by said first bearing retainer, said second bearing being seated in said second support tube such that said second end of said main gear shaft is journaled by said second bearing, said second bearing being retained by said second bearing retainer, said keyed crank shaft extending through and engaging said keyed hole of said main gear shaft, said handle attached to said first end of said keyed crank shaft, said end cap attached to said second end of said keyed crank shaft; a tubular pinion gear journalled into said pinion gear support tube of said reel body plate, said tubular pinion gear operably engaging said main gear;

a main shaft extending through said tubular pinion gear, a first end of said main shaft having a keyed surface thereon and extending into said keyed bushing of said reel body such that said main shaft is rotationally, but not slideably fixed therein, a rotor attached to said tubular pinion gear;

a spool attached to the second end of said main shaft; and a main shaft oscillation assembly attached to said main shaft for oscillating said main shaft as said handle rotates said crank assembly and said main gear.

18. The spinning reel of claim 17 wherein said main shaft oscillation assembly comprises a lead screw track defined on said main shaft, a pinion collar extending from said pinion, said pinion gear collar having a bore hole therethrough; and a follower positioned in said hole and engaging said lead screw track defined in said main shaft.

19. A spinning reel comprising:

a reel body having unitary sidewalls and a front wall, an opening opposite said front wall, and first and second support tubes extending from said sidewalls;

said reel body having a pinion gear support tube extending from said front wall;

and a rear reel body plate removably attached to said reel body at said opening, said rear reel body plate having a keyed bushing attached thereto;

a main gear assembly, said main gear assembly comprising a main gear and a main gear shaft having a keyed hole therethrough, said main gear shaft attached to and extending through said main gear along the central axis thereof;

said main gear assembly being inserted in said reel body such that the first end of said main gear shaft is positioned in said first support tube and the second end of said main gear shaft is positioned in said second support tube;

a crank assembly, said crank assembly comprising a first and a second bearing, a first and a second bearing retainer, an end cap, a keyed crank shaft having a first end and a second end, and a handle;

said first bearing being seated in said first support tube such that said first end of said main gear shaft is journaled by said first bearing, said first bearing being retained by said first bearing retainer, said second bearing being seated in said second support tube such that said second end of said main gear shaft is journaled by said second bearing, said second bearing being retained by said second bearing retainer, said keyed crank shaft extending through and engaging said keyed hole of said main gear shaft, said handle attached to said first end of said keyed crank shaft, said end cap attached to said second end of said keyed crank shaft; a tubular pinion gear journalled into said reel body and operably engaging said main gear; a main shaft extending through said tubular pinion gear, a first end of said main shaft having a keyed surface thereon and extending into said keyed bushing of said rear reel body plate such that said main shaft is rotationally, but not slideably fixed therein, a rotor attached to said tubular pinion gear;

a spool attached to the second end of said main shaft; and a main shaft oscillation assembly attached to said main shaft for oscillating said main shaft as said handle rotates said crank assembly and said main gear.

20. The spinning reel of claim 19 wherein said main shaft oscillation assembly comprises a lead screw track defined on said main shaft, a pinion collar extending from said pinion, said pinion gear collar having a bore hole therethrough; and a follower positioned in said hole and engaging said lead screw track defined in said main shaft.

21. The fishing reel of claim 19 wherein screw means removably attach said reel body to said rear reel body plate.

22. The fishing reel of claim 19 wherein said reel body has a first and a second thread tube integrally formed therein;

said rear reel body plate has a first and a second screw hole integrally formed therein; and said first screw hole of said rear reel body plate being aligned with said first thread tube of said reel body, and said second screw hole of said rear plate being aligned with said second thread tube of said reel body, such that a first screw threadably engaging said first screw hole of said rear plate and said first thread tube of said reel body, and a second screw threadably engaging said second screw hole of said rear plate and said second thread tube of said reel body thereby removably attaching said rear plate to said reel body.

23. The fishing reel of claim 19 wherein said reel body has a first anti-reverse shaft support tube;

said rear plate has a second anti-reverse shaft support tube; and an anti-reverse shaft being held by said first anti-reverse support tube and by said second anti-reverse support tube.

24. The fishing reel of claim 23 wherein said reel body has a bail trip cam integrally formed therein, said bail trip cam is positioned to engage a conventional bail wire mechanism.

* * * * *

UNITED STATES PATENT AND TRADEMARK OFFICE
CERTIFICATE OF CORRECTION

PATENT NO. : 6,059,211
DATED : May 9, 2000
INVENTOR(S) : John N. Young

It is certified that error appears in the above-indentified patent and that said Letters Patent is hereby corrected as shown below:

At Column 1, line 54, insert --the-- between "to" and "reel".
At Column 2, line 37, replace "a pawl ear" with --an engaging member--.
At Column 3, line 60, insert --a-- between "include" and "reel".
At Column 5, line 16, delete "assembly" and insert --assemble-- therefor.
At Column 5, line 29, delete "assembly" and insert --assemble-- therefor.
At Column 7, line 23, insert --follower 59-- between "and" and "having".
At Column 7, line 25, delete "follower 59".
At Column 9, line 43, replace "removable" with --removably--.

Signed and Sealed this

Sixth Day of March, 2001

Attest:

NICHOLAS P. GODICI

Attesting Officer      Acting Director of the United States Patent and Trademark Office